United States Patent Office

3,767,627
Patented Oct. 23, 1973

3,767,627
PREPARATION OF POLYLACTONES HAVING ESTER END GROUPS
Lowhardt A. A. Schoen, Geleen, Netherlands, assignor to Stamicarbon N.V., Heerlen, Netherlands
No Drawing. Filed Dec. 7, 1971, Ser. No. 205,752
Claims priority, application Netherlands, Dec. 10, 1970, 7018015
Int. Cl. C08g 17/14
U.S. Cl. 260—78.3 R
6 Claims

ABSTRACT OF THE DISCLOSURE

An improved process for the preparation of polylactones having blocked end-groups is disclosed wherein a polylactone, a mixture of polylactones, or a mixture of polylactone and lactone monomer is reacted, in the presence of a catalyst, with at least one modifier which contains at least one ester group not included in a lactone ring and which carries no reactive hydrogen substituents.

---

The present invention relates to a process for the preparation of polylactones having blocked end-groups.

Most polylactones prepared by the polymerization of a lactone of a mixture of lactones, posses reactive end-groups, notably hydroxyl and/or carboxyl end-groups. These reactive end-groups account for their relatively high solubility in water and oils, as well as their high polarity and low resistance to degradation. As a result, such polylactones are not well suited for several applications such as, for example, being admixed in polyvinylchloride, polypropylene or polyethylene, with the object of improving the properties of these polymers. On the other hand, polylactones having blocked end-groups are less soluble, less polar and more resistant to degradation than polylactones having reactive end-groups so that, upon admixing with other polymers, they are less subject to exudation or extraction from the polymer material.

It has already been suggested to prepare polylactones having blocked end-groups by esterifying a polylactone with hydroxyl end-groups, for example, by means of an excess of acid anhydride (see U.S. Pat. No. 3,169,945). However, such an esterification has not proved to be very commercially attractive because such esterification reaction is generally attended by several undesirable side reactions, such as chain degradation to oligomer products. Moreover, it is difficult to achieve complete blocking of the end-groups by esterification, bacause esterification is not quantitative but rather an equilibrium reaction which does not proceed to completion, and the esterifying agent must be carefully eliminated after the reaction .

According to the present invention, polylactones having blocked end-groups may now be formed in a very simple manner by allowing a polylactone, a mixture of polylactones, or a mixture of polylactone with a lactone monomer, to react in the presence of a catalyst with one or more modifiers which contain at least one ester group that is not included in a lactone ring, and which carry no reactive hydrogen substituents.

In this way any type of polylactone can be converted into a polylactone having blocked end-groups, specifically having end-groups that are all, or nearly all, blocked by inert ester groups.

The hydroxyl number and the acid number of these polylactones, both expressed in mg equivalents per gram of polymer and determined by means of end group titration, are equal or nearly equal to 0. Moreover, polylactones with blocked end-groups having very high molecular weights, e.g., of over 10,000, can very easily be obtained by means of the process according to the invention, whereas they are very difficult to prepare by the known procedures.

The reaction mechanism is not yet clear, but it has been established that the chains of the ultimate polylactones having blocked end-groups may differ strongly from the chains in the original polylactone, both in structure and in chain length. In the simplest case a chain is formed whose length is substantially equal to that of the chain in the original polylactone, but whose end-groups have been esterified by the alcohol group and the carboxylic acid group of the modifier respectively.

The larger the amount of modifier added, the lower the molecular weight of the ultimate blocked polylactone. Thus the molecular weight of the ultimate product formed can be accurately controlled by varying the amount of modifier added. The amount of modifier added must therefore be chosen with great care. The quantity of modifier added will preferably be in the range of from about 0.1 to 20% by weight, calculated on the basis of the polylactone originally present.

When diesters of diols, for example, diethylene-glycol diacetate, are used as the modifier, chains are formed in which, to a large extent, the diol is mostly incorporated in the chains and the end-groups are blocked in the form of esters. The chains of such polylactones are very flexible, even at low temperatures, which renders them excellently suited for use as plastifiers. For this reason, diesters of alkene glycols or polyalkene glycols are generally preferred as modifiers.

When esters of tri- or tetra-alcohols, or tri- or tetra-carboxylic acids, are used as the modifier, branched or cross-linked polylactones with blocked end-groups are formed, even in those cases where the starting product is a linear polylactone. Easters of aromatic carboxylic acids and/or aromatic alcohols yield polylactones which are blocked on either one or on both ends by an aromatic ester. Polylactones of this type possess an increased resistance to exudation and extraction from mixtures with other polymers. Hence, esters containing aromatic groups are also preferred as modifiers. Particularly good plasticizers can be prepared by using alkeneglycolbenzoate or polyalkeneglycolbenzoate as modifiers.

It has also been found that if the process of the present invention is carried out on a mixture of more than one homopolylactone, it yields polylactones with blocked end-groups that contain monomer groups and/or chain parts originating from each of the homopolylactones. In this manner, it is possible to prepare new polylactones possessing new properties.

It is evident from the foregoing that with a single type of preferably high molecular weight polylactone being used as a starting material, the process of the present invention offers the possibility of preparing a variety of blocked polylactones with markedly different properties by carefully selecting of the type and amount of modifier added, and the type and amount of lactone monomers or additional polylactones which may also be added to the reaction mixture.

The catalyst may be one of the known ester-interchanging and polymerization catalysts, for example, metal-alkoxides such as aluminum isopropoxide, magnesium methoxide, and lithium ethanolate salts such as sodium carbonate, manganese acetate, zinc borate, lead acetate, and lead salicylate; oxides such as zinc oxide, germanium dioxide, and lead oxide; tin compounds such as dibutyltin-oxide, tetrabutyldichlorodistannoxate, and hexabutyldi-chlorotristannoxate; bimetallic hydrides such as lithium-aluminum hydride and sodium-borium hydride; bimetallic alkoxides such as lithium-aluminum tetraethanolate, lithium-aluminum tetraethyleneglycolate and lithium-aluminum tetra - 1,4 - butadiolate; and chelate compounds of titanium, zirconium and hafnium such as isopropoxy titanium stearate and hydroxy titanium oleate.

It is preferred, however, to use a catalyst selected from the group of dibutyltinoxide, tetrabutyldichlorodistannoxate, hexabutyldichlorotristannoxate and bimetallic alkoxides, since these catalysts yield a good and colorless product in a relatively short period of time. An additional advantage of the tin catalysts is that they need not be removed from the product, because they contribute a stabilizing effect. The amount of catalyst present during the reaction is not very critical, but preferably will be somewhere within the range of between about 0.02 to about 6% by weight calculated on the basis of polylactone present.

The compounds suitable for use as a modifier have at least one ester group that is not included in a lactone ring, and do not carry reactive hydrogen substituents. Some examples of suitable modifiers are ethyl acetate, propylacetate, butylacetate, 2-ethylhexyl acetate, cyclohexyl acetate, phenyl acetate, amyl acetate, butyl propionate, ethyl benzoate, propyl benzoate, ethyleneglycol diacetate, ethyleneglycol dibenzoate, glycerol triacetate pentaerythritol tetraacetate, 6-acetoxyethyl capronate, 4-thiapimelic acid diethyl ester, dibenzyl adipate, dimethyl terephthalate, dibutyl terephthalate, dibutyl adipate, dipropyleneglycol dibenzoate, diethyleneglycol diacetate, diethyleneglycol dibenzoate, diethyleneglycol dibutyrate, triethyleneglycol diacetate, triethyleneglycol dipropionate, triethyleneglycol dibenzoate, tetrapropyleneglycol dipropionate, and tetraethyleneglycol dibenzoate.

It can therefore be seen that different organic mono-, di-, tri- and tetra-esters and other polyvalent esters may be employed, as modifiers provided they do not carry interferring reactive hydrogen substituents such as hydroxyl-, carboxyl-, or amino-groups. But it is preferred to use modifiers that are non-volatile or slightly volatile under the reaction conditions, having the advantage that the process need not be carried out under superatmospheric pressure. If desired, mixtures of different modifiers may also be employed.

The starting material may be a homo-polylactone, a co-polylactone or a mixture of polylactones obtained by polymerization of one or several polymerizable lactones chosen from those represented by the general formula:

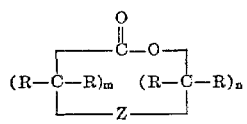

where $m$ and $n$ denote integers between 1 and 10, Z is a —$CH_2$—, —O—, —S—, or —$CR_2$— group, and the substituents R denote hydrogen, alkyl, alkoxy, halogen or other inert substituents which may differ from one another. Some examples of suitable starting materials are polyvalerolactone, polycaprolactone, polyoenantholactone, poly-γ-methylvalerolactone, poly-δ-ethylvalerolactone, polypivalolactone, polyethoxyvalerolactone, poly-ε-methylcaprolactone, poly - γ - methylcaprolactone, poly-γ-methoxycaprolactone, poly-δ-methylcaprolactone, poly-δ-ethylcaprolactone, polymethyloenantholactone, polyethyloenantholactone, polymethoxyoenantholactone, polyethoxyoenantholocatone and polydimethyloenantholactone, copolylactones and terpolylactones of the above-mentioned lactones. The molecular weight of the original polylactone is not critical and may be for example 1000 as well as 150,000.

It is preferred to start from poly-ε-caprolactone, poly-δ-valerolactone, copolymers of ε-caprolactone and methylsubstituted ε-caprolactone, copolymers of ε-caprolactone and δ-valerolactone, and mixtures thereof. These polylactones are easily accessible and thermally stable.

One may also start from a mixture of one or several polylactones and one or several monomeric lactones.

In most cases it is possible to start from a polylactone that has been free of catalyst residues. But it is also possible to use polylactones that still contain active catalyst. In the latter case no catalyst need be added for the modification reaction, or one may add a smaller amount of catalyst than would normally be used.

The starting polymer may be a commercial product, or a polylactone made a considerable time before the modification. It is also possible to mix freshly prepared polylactone with the modifier, and allow these to react, or to add modifier to a polylactone that is still in the polymerization reactor. In the two latter cases, the polylactone usually still contains sufficient active catalyst.

Simplicity of feeding can be achieved by mixing the catalyst and/or the modifier with a lactone or a mixture of lactones prior to the reaction and supplying this mixture to the reactor. The reaction can be carried out at temperatures between about 60° C. and 300° C., but preferably at a temperature between about 100 and 200° C. To avoid degradation of the polymer and discoloration, it is preferred to carry out the modification in the absence of oxygen and water, for example, in a dry nitrogen atmosphere. The pressure at which the reaction is carried out is not critical, and may be atmospheric, superatmospheric or below atmospheric.

A procedure for performing the reaction of this invention, most simply stated, comprises heating a polylactone melt to the required temperature, adding modifier, and adding the catalyst should this be necessary, and allowing the mixture to react for 0.5–4 hours at elevated temperature in a dry nitrogen atmosphere, and if possible, with simultaneous agitation. If desired, the catalyst can be deactivated and removed in a known manner after the reaction.

The process of the present invention will be further illustrated with reference to the following examples.

The reduced viscosity $\eta_r$ mentioned in these examples was determined on solutions of 0.4 g. of polymer in 100 ml. of chloroform at 30° C.

The hexabutyldichlorotristannoxate catalyst employed very probably contains minor quantities of tetrabutyldichlorodistannoxate and was prepared by stirring dibutyltindichloride at 25–50° C. with an excess of aqueous 4 N KOH solution, removing the precipitate by filtration, and followed by washing and drying.

EXAMPLE I

Two commercial polycaprolactone grades (PCL–300 and PCL–700, both made by Union Carbide Corp.) were separately modified by heating 20,000 g. of the polymer to 170° C. and allowing it to react with 0.1 g. (0.5% wt.) of hexabutyldichlorotristannoxate and 1.2 g. (6% wt.) of ethyleneglycol diacetate in a dry nitrogen atmosphere at atmospheric pressure. Soon after the start of the reaction the highly viscous melt became thinly liquid, so that it could be stirred. At various intervals during the reaction samples were taken for determination of the reduced viscosity. The results with each grade of polycaprolactone starting material are compiled in Table 1. The ultimate polylactones with blocked end-groups were determined to have a hydroxyl number equal to 0.1 mg. eq./g. or lower, and an acid number of 0.01 mg. eq./g.

TABLE 1

| Time (minutes) | PCL–300, $\eta_r$ [1] | PCL–700, $\eta_r$ [2] |
|---|---|---|
| 30 | 0.2 | 0.6 |
| 45 | 0.2 | 0.6 |
| 60 | 0.2 | 0.6 |

[1] $\eta_r$ before the reaction = 0.5.
[2] $\eta_r$ before the reaction = 1.1.

EXAMPLE II

Modification of hydroxyl-terminated polycaprolactone

ε-Polycaprolactone was polymerized with 0.2% wt. of LiAl[—O—(CH$_2$)$_4$—OH]$_4$, yielding a tough white polymer. This polymer was purified by dissolving it in acetone, treating the solution with sulphuric acid, and removing the precipitated metal salts. The polymer was then precipitated from the solution, washed and dried. The reduced viscosity of this polymer was determined to be 1.5. Then 25.00 g. of this catalyst-free polycaprolactone were melted in a nitrogen atmosphere and heated to 150° C., whereupon 1.5 g. of ethyleneglycol diacetate and 0.125 g. of hexabutyldichlorotristannoxate were added to the melt. The reaction terminated after 120 minutes, yielding a polylactone with a reduced viscosity of 0.6, a hydroxyl number of 0.1, and an acid number of 0.00.

For the purpose of comparison, a melt of 25.00 g. of the catalyst-free polylactone and 1.5 g. of ethyleneglycol diacetate were heated at 150° C. for 120 minutes. After this period, the viscosity of the lactone had not appreciably decreased, which shows that the presence of a catalyst is essential.

EXAMPLE III

Modification of a polylactone mixture

A polyvalerolactone was prepared by polymerization of 20.00 g. of δ-valerolactone and 0.1 g. of hexabutyldichlorotristannoxate, which was thereafter allowed to cool. After 24 hours, this polyvalerolactone was melted together with 20.00 g. of polycaprolactone (PCL-700), and allowed to react for 2 hours with 6.0 g. of ethyleneglycol diacetate at 150° C. in a nitrogen atmosphere. This yielded a brittle polylactone with a reduced viscosity of 0.54, a hydroxyl number of 0.1 and an acid number of 0.01.

Repeating the above experiment of Example III, it was found that it does not make any difference whether the polymer still containing catalyst is first cooled, stored and then modified, or whether the still molten polymer is modified immediately after the polymerization. In the following examples, the modifier was therefore added immediately after the polymerization.

EXAMPLE IV 25.00 g. of ε-caprolactone was polymerized with 0.125 g. of hexabutyldichlorotristannoxate. The polymerization terminated after 10 minutes, yielding a colorless polymer with a reduced viscosity of 1.5. Next, 1.5 g. of ethyleneglycol diacetate was added and the temperature of the melt was maintained at 160° C. At various times after the addition of modifier, samples were taken for determination of the reduced viscosity (see Table 2). After 3 hours, the reduced viscosity of the polylactone was 0.2, the hydroxyl number 0.0 and the acid number 0.01. The cooled product was a white waxy substance.

TABLE 2

| Time (minutes): | $\eta_r$ |
|---|---|
| 15 | 0.6 |
| 30 | 0.4 |
| 45 | 0.4 |
| 60 | 0.3 |
| 90 | 0.3 |
| 120 | 0.2 |
| 180 | 0.2 |

EXAMPLE V

Following the procedure described in the above example, poly-ε-caprolactones containing 0.5% wt. of active hexabutyldichlorotristannoxate catalyst were modified with various quantities of ethyleneglycol diacetate at 120° C. over a period of 2 hours. The reduced viscosity and the appearance of these quantitatively chain-terminated polycaprolactones are indicated in Table 3.

TABLE 3

| Ethyleneglycol-diacetate, percent wt. | $\eta_r$ | Product |
|---|---|---|
| 0 | 1.5 | Tough white polymer. |
| 0.5 | 0.8 | Do. |
| 1.0 | 0.5 | Brittle white polymer. |
| 2.0 | 0.3 | Hard white wax. |
| 4.0 | 0.2 | Waxy white polymer. |

EXAMPLE VI

By means of the procedure described in Example IV, polycaprolactones containing 0.5% wt. of hexabutyldichlorotristannoxate and having a reduced viscosity of 1.5 were modified with various modifiers. The results are summarized in Table 4.

TABLE 4

| Modifier | Percent wt. | $\eta_r$ | Hydroxyl number | Acid number |
|---|---|---|---|---|
| Amylacetate | 4 | 0.7 | 0.0 | 0.00 |
| Diethyleneglycoldiacetate | 2 | 0.3 | 0.0 | 0.01 |
| Triethyleneglycoldiacetate | 2 | 0.3 | 0.0 | 0.00 |
| Glyceroltriacetate | 10 | 0.1 | 0.0 | 0.01 |

EXAMPLE VII

A polyvalerolactone with a reduced viscosity of 2.3 was prepared by polymerizing δ-valerolactone with 0.3% wt. of hexabutyldichlorotristannoxate in a nitrogen atmosphere at 120° C. After the polymerization had terminated, 5 wt.-percent of ethyleneglycol dibenzoate was added as a modifier, and the reaction was continued at 120° C. After 100 minutes a polylactone formed having a reduced viscosity of 0.3, a hydroxyl number of 0.0 and an acid number of 0.01 which, upon cooling, transformed into a white waxy polymer.

EXAMPLE VIII

A hydroxyl-terminated polycaprolactone with a reduced viscosity of 1.5 was prepared by polymerization of ε-caprolactone with 0.2% wt. of $$LiAl[—O—(CH_2)_4—OH]_4$$

catalyst.

After the polymerization, 6% wt. of ethyleneglycol diacetate modifier were added, and the reaction was continued at 150° C. The reduced viscosity decreased to 0.9 after 60 min., and to 0.7 after 120 min. The polycaprolactone obtained after 3 hours had a reduced viscosity of 0.6, a hydroxyl number of 0.1 and an acid number of 0.00, and changed into a brittle white wax upon cooling.

EXAMPLE IX

A copolylactone was prepared by polymerizing 80 mole percent of ε-caprolactone, 10 mole percent of γ-methyl-ε-caprolactone and 10 mole percent of ε-methyl-ε-caprolactone with 0.2% wt. of Mg[Al(OC$_2$H$_5$)$_4$]$_2$ catalyst, forming a polylactone with a reduced viscosity of 0.9. After the addition of 8% wt. of ethyleneglycol diacetate modifier, the mixture was allowed to react at 150° C. for another 2 hours. A soft, waxy polylactone with a reduced viscosity of 0.1, a hydroxyl number of 0.1 and an acid number of 0.01 was obtained.

What is claimed is:

1. A process for the preparation of polylactones having blocked end-groups consisting essentially in reacting, in the presence of a catalyst, a starting material selected from the group consisting of a polylactone, a mixture of polylactones, or a mixture of at least one polylactone and at least one lactone monomer, with at least one modifier, said modifier containing at least one carboxylate ester group not included in a lactone ring of said starting material and said modifier further containing no reactive hydrogen substituents.

2. The process of claim 1 wherein at least one modifier is selected from the group consisting of a diester of an alkene glycol or a polyalkene glycol.

3. The process of claim 1 wherein at least one modifier contains at least one aromatic group.

4. The process of claim 1 wherein at least one modifier is selected from the group consisting of an alkene glycol or polyalkeneglycol dibenzoates.

5. The process of claim 1 wherein said reaction is carried out in the presence of a catalyst selected from the group consisting of dibutyltinoxide, tetrabutyldichlorodistannoxate, hexabutyldichlorotristannoxate and bimetallic alkoxides.

6. The process of claim 1 wherein said starting material includes a polylactone prepared from a lactone selected from the group consisting of $\epsilon$-caprolactone, methyl-$\epsilon$-caprolactone, $\delta$-valerolactone, methyl-$\delta$-valerolactone, or combinations thereof.

References Cited
UNITED STATES PATENTS

| | | | |
|---|---|---|---|
| 2,890,208 | 6/1959 | Young et al. | 260—78.3 |
| 2,977,385 | 3/1961 | Fowler et al. | 260—475 |
| 3,169,945 | 2/1965 | Hostettler et al. | 260—78.3 |

HAROLD D. ANDERSON, Primary Examiner

E. A. NIELSEN, Assistant Examiner

U.S. Cl. X.R.

260—48.4 A, 823